(12) United States Patent
Zhang

(10) Patent No.: US 10,828,595 B2
(45) Date of Patent: Nov. 10, 2020

(54) FUEL TANK CAP WITH CHARCOAL CANISTER

(71) Applicant: CHONGQING BAIKE DINGYU TECHNOLOGY Co., Ltd., Chongqing (CN)

(72) Inventor: Yi Zhang, Chongqing (CN)

(73) Assignee: CHONGQING BAIKE DINGYU TECHNOLOGY Co., Ltd., Chongqing (CN)

( * ) Notice: Subject to any disclaimer, the term of this patent is extended or adjusted under 35 U.S.C. 154(b) by 213 days.

(21) Appl. No.: 15/961,746

(22) Filed: Apr. 24, 2018

(65) Prior Publication Data

US 2018/0369738 A1 Dec. 27, 2018

(30) Foreign Application Priority Data

Jun. 21, 2017 (CN) .......................... 2017 1 0476551

(51) Int. Cl.
*B01D 53/04* (2006.01)
*B60K 15/04* (2006.01)
*B60K 15/035* (2006.01)

(52) U.S. Cl.
CPC ........ *B01D 53/0407* (2013.01); *B60K 15/035* (2013.01); *B60K 15/03504* (2013.01); *B60K 15/0406* (2013.01); *B01D 2253/102* (2013.01); *B01D 2257/702* (2013.01); *B01D 2258/06* (2013.01); *B01D 2259/4516* (2013.01); *B60K 2015/03547* (2013.01); *B60K 2015/0451* (2013.01); *B60K 2015/0496* (2013.01)

(58) Field of Classification Search
CPC .... B60K 15/03504; B60K 2015/03514; B60K 15/0406; B01D 53/0407
USPC .................................................. 220/371, 372
See application file for complete search history.

(56) References Cited

U.S. PATENT DOCUMENTS

2004/0232151 A1* 11/2004 Bauer .................... A61L 2/022
220/371
2008/0110889 A1* 5/2008 Ohsawa ........... B60K 15/03504
220/288
2013/0341331 A1* 12/2013 Bork .................. B60K 15/0406
220/560.03

* cited by examiner

*Primary Examiner* — Jeffrey R Allen
(74) *Attorney, Agent, or Firm* — Craft Chu PLLC; Andrew W. Chu

(57) ABSTRACT

The fuel tank cap with charcoal canister includes a fuel tank inner cap and a fuel tank outer cap. A filling chamber is disposed in the fuel tank inner cap. The fuel tank outer cap wraps up the upper port of the filling chamber. The fuel tank inner cap has a volume chamber having an upper vent cap. Between the side wall of the upper vent cap and the inner wall of the volume chamber, there is an air gap. The filling chamber has a lower breathing panel. Between the lower breathing panel and the bottom of the filling chamber, there is a welding ring. The upper port is on the inner side of the welding ring. The lower surface of the lower breathing panel is fixed and connected with the filling chamber via the welding ring. The bottom surface of the volume chamber has an air inlet/outlet.

9 Claims, 6 Drawing Sheets

FUEL TANK CAP WITH CHARCOAL CANISTER

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the technical field of charcoal canister equipment, and, more particularly, to a fuel tank cap with charcoal canister.

2. Description of Related Art Including Information Disclosed Under 37 CFR 1.97 and 37 CFR 1.98

In the design of most fuel tank caps available on the market, an inner chamber is filled up with carbon powder; when the pressure in the fuel tank exceeds external pressure, the fuel gas in the fuel tank is emitted into the external environment via the carbon powder chamber to achieve a balance of internal and external pressure; when the fuel gas passes through the carbon powder chamber, it is partially received by the carbon powder, and the filtered gas is emitted into the external environment to realize the goals of controlling fuel emission and reducing contamination. To ensure that the fuel gas enters the carbon powder space in the fuel tank cap, at the bottom of the fuel tank cap there must be a channel for the fuel gas to pass through; in actual service, when the gasoline engine stops and the fuel tank produces a negative pressure, a little carbon powder in the fuel tank cap will fall into the fuel tank through this channel, and contaminate the fuel in the fuel tank.

BRIEF SUMMARY OF THE INVENTION

The technical problem to be solved by the present invention is to provide a structurally-simple fuel tank cap with charcoal canister that can prevent the fuel-adsorbing filler in the fuel tank cap from falling into the fuel tank and thus avoid the contamination of fuel in the fuel tank by the fuel-adsorbing filler.

The technical scheme proposed by the present invention to solve the above technical problem is: a fuel tank cap with charcoal canister, which includes a fuel tank inner cap and a fuel tank outer cap, wherein a filling chamber with upper opening is disposed in the center of the said fuel tank inner cap; the said fuel tank outer cap is designed above the said fuel tank inner cap; the said fuel tank outer cap wraps up the upper port of the said filling chamber;

The said fuel tank inner cap is designed with a volume chamber at the bottom; the upper end of the said volume chamber is connected with the said filling chamber; the said volume chamber has an upper vent cap at the upper port; between the side wall of the said upper vent cap and the inner wall of the said volume chamber there is an air gap, which makes convenience for guiding the fuel in the said volume chamber into the said filling chamber;

The said filling chamber has a lower breathing panel at the bottom, which covers the upper port of the said volume chamber; between the said lower breathing panel and the bottom of the said filling chamber there is a welding ring; the upper port of the said volume chamber is configured on the inner side of the said welding ring; the lower surface of the said lower breathing panel is fixed and connected with the said filling chamber via the welding ring;

The bottom surface of the said volume chamber is designed with air inlet/outlet, via which the volatilized fuel in the fuel tank is guided into the said volume chamber;

The said filling chamber is provided with fuel-adsorbing filler.

The beneficial effect of the present invention is that: Between the lower breathing panel and the bottom of the filling chamber there is a welding ring, designed on the outer side of the upper port of the volume chamber; the welding ring is used to fix the lower breathing panel at the bottom of the volume chamber, so that there would be no gap between the filling chamber and the lower breathing panel. In this way, the present invention prevents the fuel-adsorbing filler from first entering the volume chamber and then entering the fuel tank through the gap between the filling chamber and the lower breathing panel, and thus avoids both the contamination of fuel in the fuel tank and the clogging of the carburetor by the fuel-adsorbing filler. Thus, it is safer and more environment-friendly.

Based on the above technical scheme, the present invention can also be improved as follows.

Furthermore, the said welding ring is an ultrasonic welding ring.

The beneficial effect of adopting the above further scheme is that: Ultrasonic welding can create molecular layer fusion between two object surfaces through mutual friction, so adopting the ultrasonic welding ring can more closely seal the connection between the lower breathing panel and the bottom of the filling chamber and prevent the fuel-adsorbing filler from passing between the lower breathing panel and the bottom of the filling chamber.

Furthermore, it also includes an upper breathing panel covering the top of the said fuel-adsorbing filler, wherein the said upper breathing panel is set at the upper port of the said filling chamber.

The beneficial effect of adopting the above further scheme is that: The setting of the upper breathing panel can prevent the fuel-adsorbing filler from leaking out through the gap between the fuel tank outer cap and the fuel tank inner cap.

Furthermore, it also includes an inner deck covering the upper port of the said filling chamber, wherein the said inner deck is designed between the said fuel tank outer cap and the said upper breathing panel.

The beneficial effect of adopting the above further scheme is that: The setting of the inner deck can enhance the role of preventing the fuel-adsorbing filler from leaking out.

Furthermore, the said inner deck is designed with several upper vent holes while the said upper vent cap is designed with several lower vent holes; the number of the said upper vent holes is the same with the number of the said lower vent holes; the said lower vent holes are set right above the said air inlet/outlet while the said upper vent holes are set right above the said lower vent holes in one-to-one correspondence.

The beneficial effect of adopting the above further scheme is that: Relying on the setting of the upper vent holes and the lower vent holes, the filtered gas can be emitted into the external environment.

Furthermore, the said volume chamber is designed inside with a lower vent cap, the said lower vent cap is designed in the center with a through-hole, and the said through-hole is designed inside with a breathing valve.

The beneficial effect of adopting the above further scheme is that: The setting of the breathing valve can maintain air pressure balance in the tank, reduce the volatilization of fuel gas and fully utilize the tank's pressure-bearing capacity to reduce fuel gas emission.

Furthermore, the said volume chamber is enclosed by funnel-shaped side wall, wherein the side wall of the said volume chamber is designed at the upper end with an installation base that extends towards the inside of the container chamber and that is used to install the said lower vent cap.

The beneficial effect of adopting the above further scheme is that: The setting of the installation base can more firmly fix the lower vent cap.

Furthermore, the said fuel tank inner cap is installed at the bottom with a removable hook.

Furthermore, the top of the said hook is clamped with the bottom of the said fuel tank inner cap in the center.

The beneficial effect of adopting the above further scheme is that: Adopting removable connection between the hook and the fuel tank inner cap through clamping makes convenience for the installation of the hook.

Furthermore, the said lower breathing panel has a smooth lower surface.

The beneficial effect of adopting the above further scheme is that: The said lower breathing panel has a smooth lower surface. The smooth lower surface of the lower breathing panel can prevent the lower breathing panel from passing through the welding between the ultrasonic welding ring and the bottom of the filling chamber. By virtue of the higher sealing performance of the smooth surface after welding, there is no gap between the lower breathing panel and the bottom of the filling chamber, which further avoids the passage of the fuel-adsorbing filler.

Furthermore, the said fuel-adsorbing filler is carbon powder.

The beneficial effect of adopting the above further scheme is that: The carbon powder has an excellent fuel-adsorbing effect, and can enhance the purification of fuel gas.

Furthermore, the said fuel tank inner cap is set at the bottom with a slot for connection with fuel tank opening.

The beneficial effect of adopting the above further scheme is that: The fuel tank inner cap is set at the bottom with a slot for connection between the fuel tank inner cap and the fuel tank.

Furthermore, the said slot is designed inside with an O ring for sealing purpose.

The beneficial effect of adopting the above further scheme is that: The slot is designed inside with an O ring that can improve the sealing performance of the connection between the fuel tank inner cap and fuel tank opening.

Figure 1:
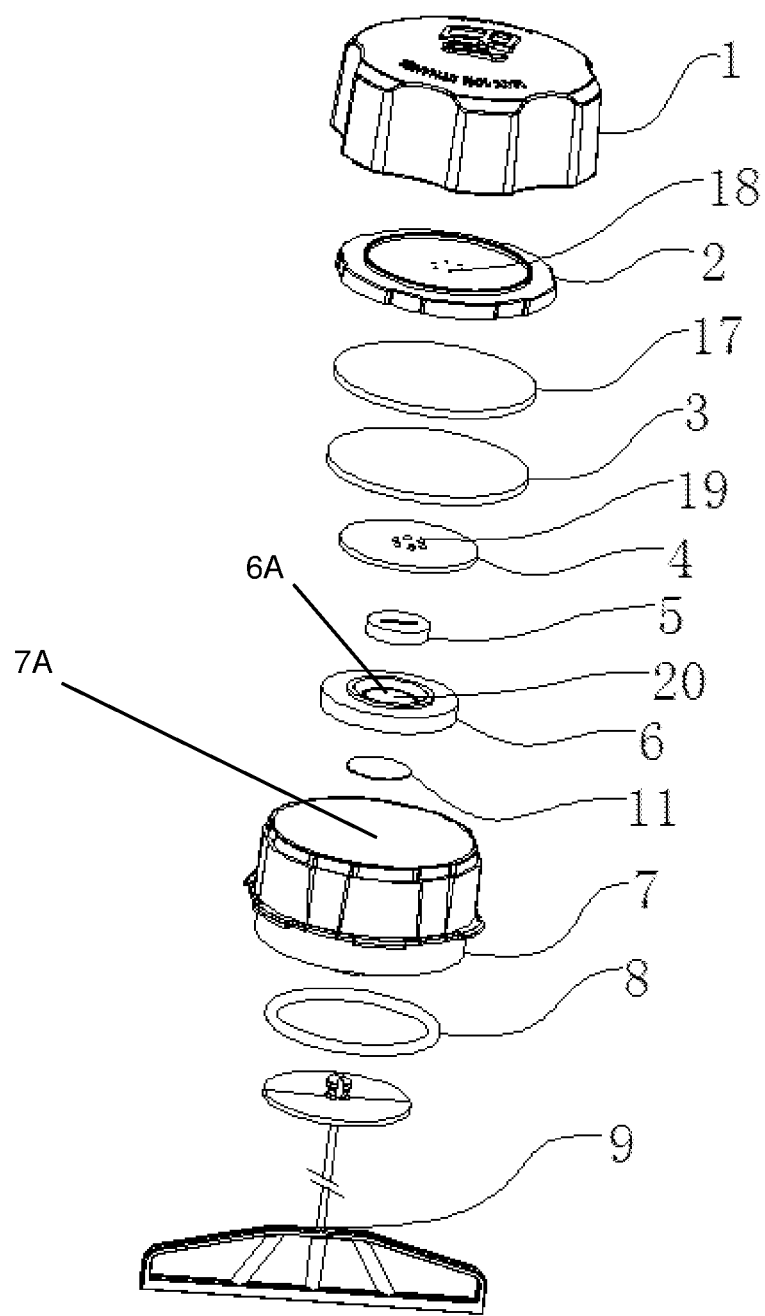
FIG. 1 provides the exploded perspective view of the present invention.

The components represented by figures in the drawings are listed below:

1: fuel tank outer cap; 2: inner deck; 3: lower breathing panel; 4: upper vent cap; 5: breathing valve; 6: lower vent cap; 7: fuel tank inner cap; 8: O ring; 9: hook; 10: fuel-adsorbing filler; 11: breathing film; 12: filling chamber; 13: volume chamber; 14: air gap; 15: welding ring; 16: vent hole; 17: upper breathing panel; 18: upper vent hole; 19: lower vent hole; 20: through-hole; 21: installation base; 22: slot.

DETAILED DESCRIPTION OF THE INVENTION

Drawings are used in combination to describe the principles and characteristics of the utility model; the embodiment cited is intended only to illustrate and not to limit the scope of the present invention.

As shown in FIG. 1, FIG. 2, FIG. 3 and FIG. 6, the present invention includes a fuel tank outer cap 1 and a fuel tank inner cap 7, wherein a filling chamber 12 with upper opening or an upper filling chamber opening 12A, a lower filling chamber end 12B being opposite the upper filling chamber opening and having a filling chamber bottom portion 12C and a filling chamber side wall 12D, and the upper filling chamber opening 12A is disposed in the center (inner cap center 7A) of the said fuel tank inner cap 7. The fuel tank outer cap 1 is designed above the said fuel tank inner cap 7. The fuel tank outer cap 1 wraps up the upper port of the said filling chamber 12. The fuel tank inner cap 7 is designed with a volume chamber 13 with an upper volume chamber port 13A connected to the lower filling chamber end 12B, and a lower volume chamber end 13B opposite the upper volume chamber port, the volume chamber 13 having a volume chamber bottom portion 13C at the lower volume chamber end, and an inner volume chamber side wall 13D connected to the filling chamber bottom portion. The volume chamber 13 is at the bottom of the fuel tank inner cap 7. The upper end of the said volume chamber 13 is connected with the said filling chamber 12. The volume chamber 13 has an upper vent cap 4 at the upper port; between the side wall (upper vent cap side wall 4A) of the said upper vent cap 4 and the inner wall of the said volume chamber 13 there is an air gap 14, which makes convenience for guiding the fuel in the said volume chamber 13 into the said filling chamber 12; the said filling chamber 12 has a lower breathing panel 3 at the bottom, which covers the upper port of the said volume chamber 13; between the said lower breathing panel 3 and the bottom of the said filling chamber 12 there is a welding ring 15; the upper port of the said volume chamber 13 is configured on the inner side of the said welding ring 15; the lower surface of the said lower breathing panel 3 is fixed and connected with the said filling chamber 12 via the welding ring 15; the bottom surface of the said volume chamber 13 is designed with air inlet/outlet 16, via which the volatilized fuel in the fuel tank is guided into the said volume chamber 13; the said filling chamber 12 is provided with fuel-adsorbing filler 10; the said fuel-adsorbing filler 10 is powdered ink.

Between the lower breathing panel 3 and the bottom of the filling chamber 12 there is a welding ring 15, designed on the outer side of the upper port of the volume chamber 13; the welding ring 15 is used to fix the lower breathing panel 3 at the bottom of the filling chamber 12, so that there would be no gap between the filling chamber 12 and the lower breathing panel 3. In this way, the present invention prevents the fuel-adsorbing filler 10 from first entering the volume chamber 13 and then entering the fuel tank through the gap between the filling chamber 12 and the lower breathing panel 3, and thus avoids both the contamination of fuel in the fuel tank and the clogging of the carburetor by the fuel-adsorbing filler 10. Thus, it is safer and more environment-friendly.

Figure 4:
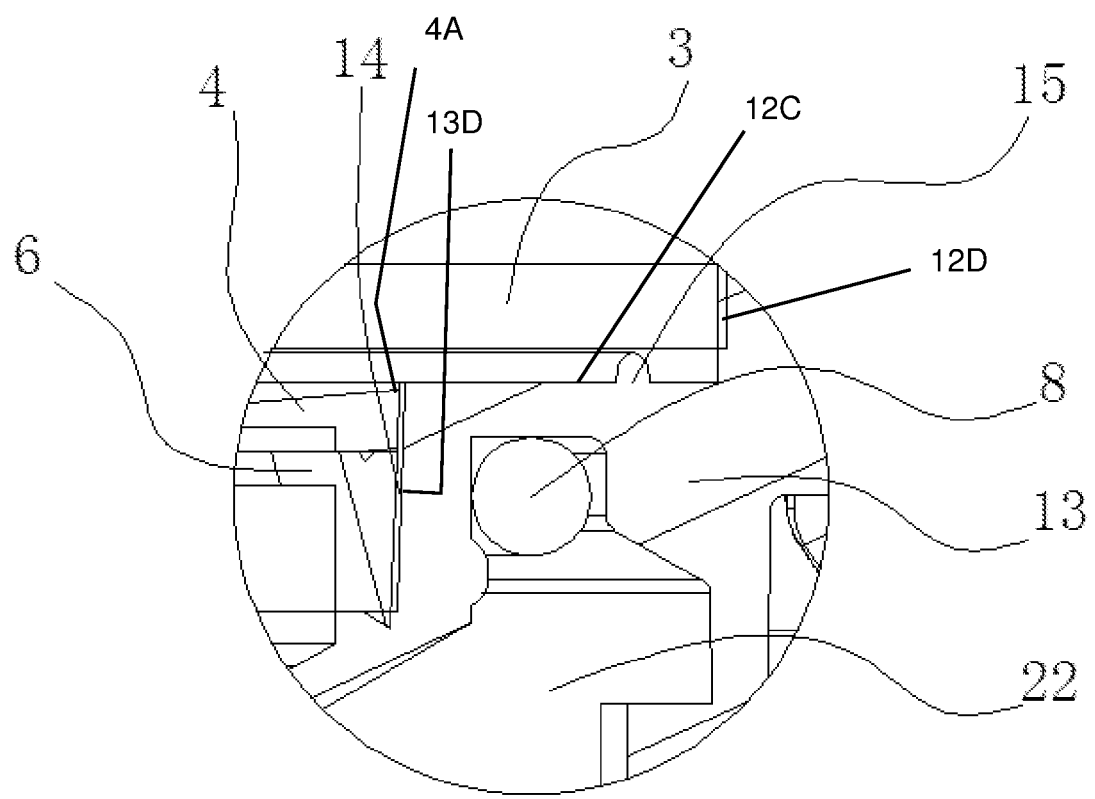
FIG. 4 provides the partial enlarged sectional view of the setting position of the welding ring in FIG. 3 of the present invention.
Figure 5:
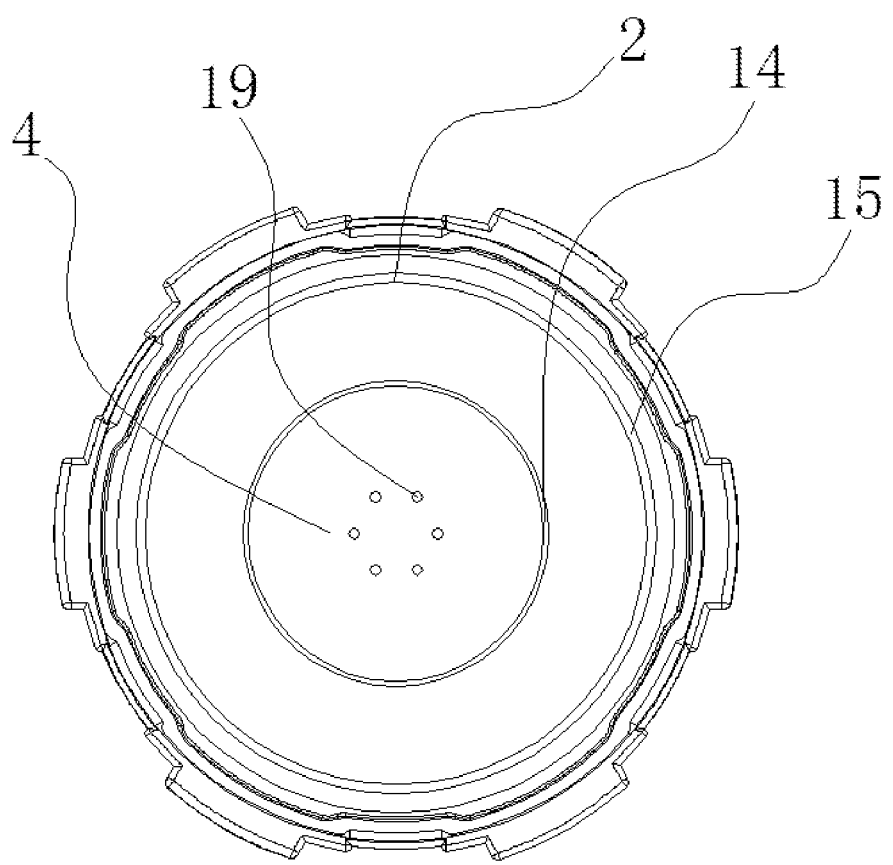
FIG. 5 provides the top plan view of the fuel tank inner cap of the present invention.
Figure 6:
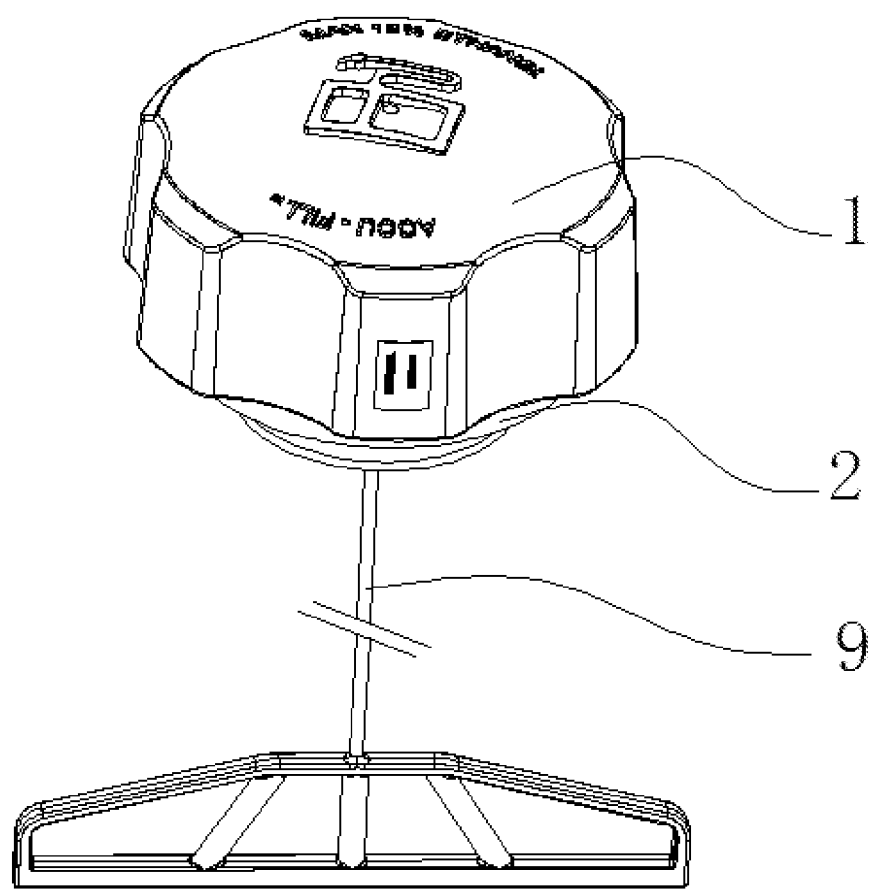
FIG. 6 provides the perspective view of a structural diagram of the present invention.

As shown in FIG. 4 and FIG. 5, in the embodiment of the present invention, the said welding ring 15 is an ultrasonic welding ring, and ultrasonic welding can create molecular layer fusion between two object surfaces through mutual friction, so adopting the ultrasonic welding ring can more closely seal the connection between the lower breathing panel 3 and the bottom of the filling chamber 12 and prevent the fuel-adsorbing filler 10 from passing between the lower breathing panel 3 and the bottom of the filling chamber 12.

Figure 2:
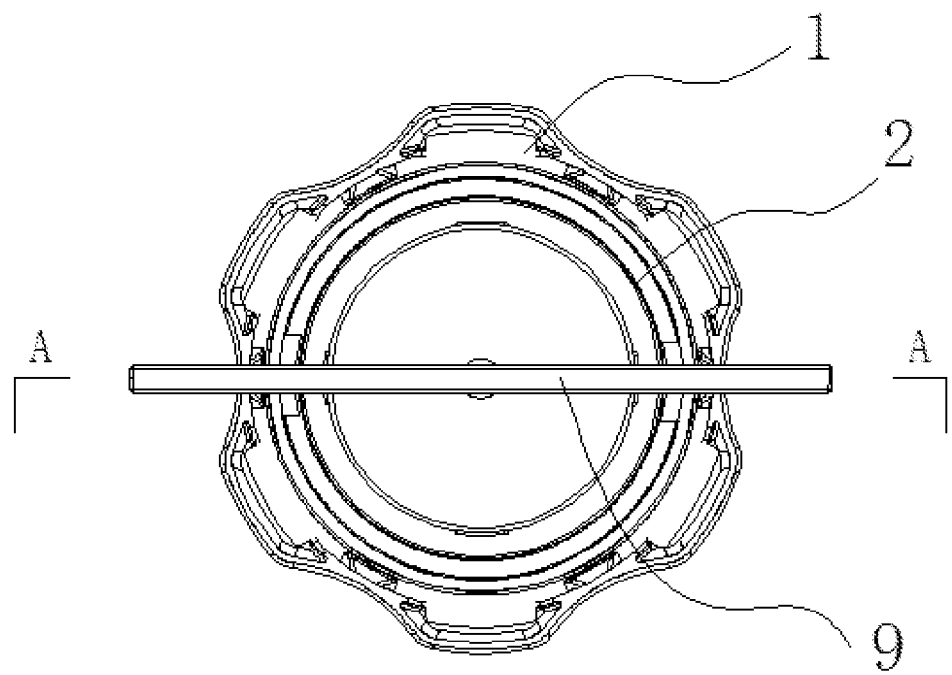
FIG. 2 provides the bottom plan view of the present invention.
Figure 3:
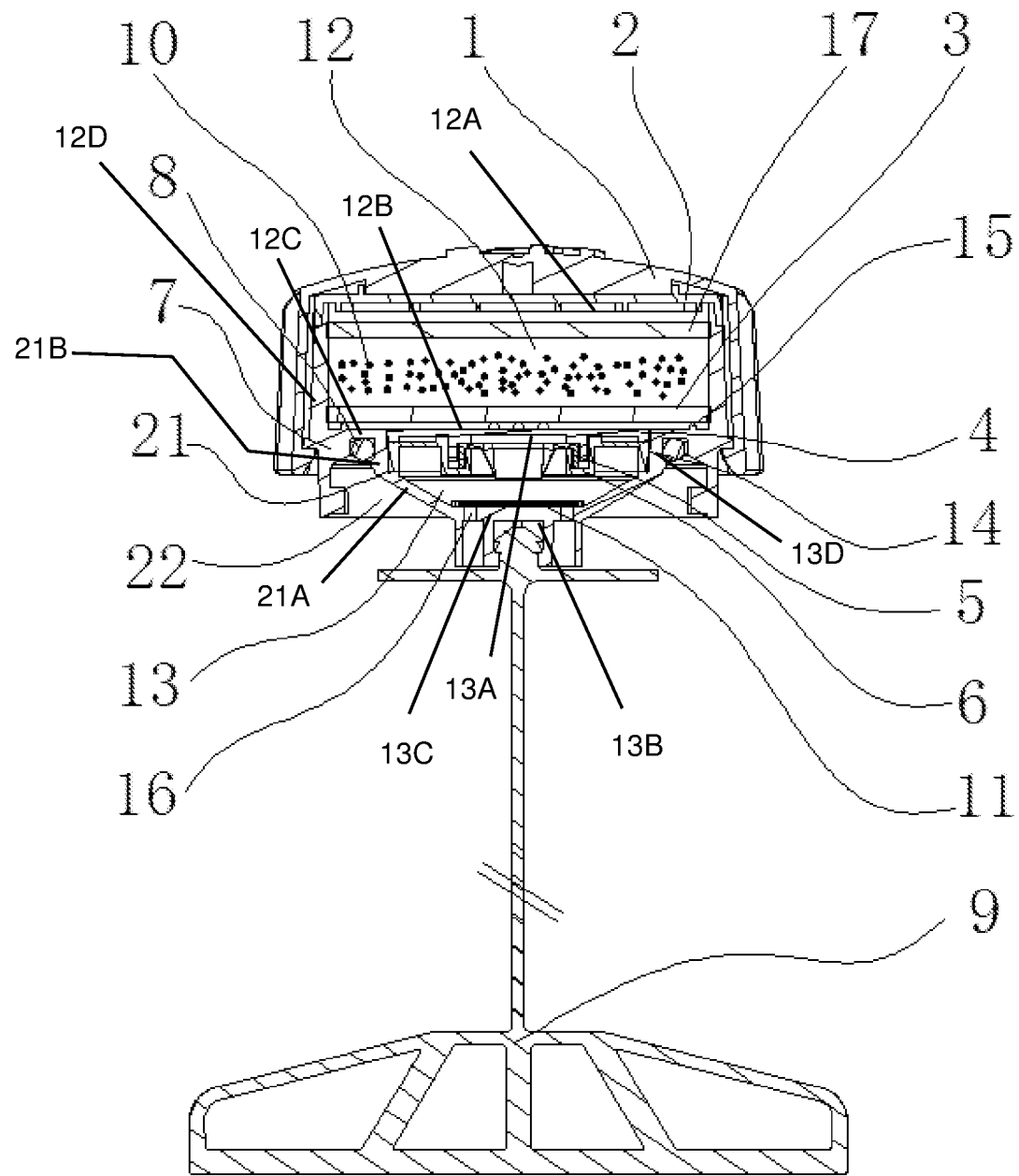
FIG. 3 provides the sectional view of plane A-A in FIG. 2 of the present invention.

As shown in FIG. 2, in the embodiment of the present invention, it also includes an upper breathing panel 17 covering the top of the said fuel-adsorbing filler 10, wherein the said upper breathing panel 17 is set at the upper port of the said filling chamber 12; it also includes an inner deck 2 covering the upper port of the said filling chamber 12, wherein the said inner deck 2 is designed between the said fuel tank outer cap 1 and the said upper breathing panel 17; the setting of the upper breathing panel 17 can prevent the fuel-adsorbing filler 10 from leaking out through the gap between the fuel tank outer cap 1 and the fuel tank inner cap 7; the setting of the inner deck 2 can enhance the role of preventing the fuel-adsorbing filler 10 from leaking out.

In the embodiment of the present invention, the said lower breathing panel 3 has a smooth lower surface. The smooth lower surface of the lower breathing panel 3 can prevent the lower breathing panel 3 from passing through the welding between the ultrasonic welding ring 15 and the bottom of the filling chamber 12. By virtue of the higher sealing performance of the smooth surface after welding, there is no gap between the lower breathing panel 3 and the bottom of the filling chamber 12, which further avoids the passage of the fuel-adsorbing filler 10.

As shown in FIG. 1, in the embodiment of the present invention, the said inner deck 2 is designed with several upper vent holes 18 while the said upper vent cap 4 is designed with several lower vent holes 19; the number of the said upper vent holes 18 is the same with the number of the said lower vent holes 19; the said lower vent holes 19 are set right above the said air inlet/outlet 16 while the said upper vent holes 18 are set right above the said lower vent holes 19 in one-to-one correspondence. Relying on the setting of the said upper vent holes 18 and the said lower vent holes 19, the filtered gas can be emitted into the external environment.

As shown in FIG. 2, in the embodiment of the present invention, the said volume chamber 13 is designed inside with a lower vent cap 6, the said lower vent cap 6 is designed in the center (lower vent cap center 6A) with a through-hole 20, and the said through-hole 20 is designed inside with a breathing valve 5. The setting of the breathing valve 5 can maintain air pressure balance in the tank, reduce the volatilization of fuel gas and fully utilize the tank's pressure-bearing capacity to reduce fuel gas emission. The said volume chamber 13 is enclosed by funnel-shaped side wall, wherein the side wall of the said volume chamber 13 is designed at the upper end with an installation base 21 that extends towards the inside of the container chamber and that is used to install the said lower vent cap 6. The setting of the installation base 21 can more firmly fix the lower vent cap 6. At the bottom of the said volume chamber 13 there is a breathing film 11 that covering the said vent hole 16. The setting of the breathing film 11 can filter the volatilized fuel gas to some extent and reduce the volatilization of fuel gas.

As shown in FIG. 2, in the embodiment of the present invention, the said fuel tank inner cap 7 is installed at the bottom with a removable hook 9. The top of the said hook 9 is clamped with the bottom of the said fuel tank inner cap 7 in the center. Adopting removable connection between the hook 9 and the fuel tank inner cap 7 through clamping makes convenience for the installation of the hook 9. The said fuel tank inner cap 7 is set at the bottom with a slot 22 for connection with fuel tank opening, and the said slot 22 is designed inside with an O ring for sealing purpose. The fuel tank inner cap 7 is set at the bottom with a slot 22 for connection between the fuel tank inner cap 7 and the fuel tank. The slot 22 is designed inside with an O ring that can improve the sealing performance of the connection between the fuel tank inner cap 7 and fuel tank opening.

Between the lower breathing panel 3 and the bottom of the filling chamber 12 there is a welding ring 15, designed on the outer side of the upper port of the volume chamber 13; the welding ring 15 is used to fix the lower breathing panel 3 at the bottom of the filling chamber 12, so that there would be no gap between the filling chamber 12 and the lower breathing panel 3. In this way, when the gasoline engine stops and the fuel tank produces a negative pressure, the setting of ultrasonic welding ring 15 of the present invention prevents the carbon powder in the fuel tank cap from falling into the fuel tank through this channel, and thus avoids both the contamination of fuel in the fuel tank and the clogging of the carburetor by the carbon powder. Thus, compared with prior art, it is safer and more environment-friendly.

Described above is only one preferred embodiment of the present invention, which is not intended to limit the present invention. Any and all amendments, adoption by equation, improvements and so forth made in the spirit or principles of the present invention shall be covered by the scope of protection of the present invention.

I claim:

1. A fuel tank cap with charcoal canister, the cap comprising:
    a fuel tank outer cap;

a fuel tank inner cap, having an inner cap center,
wherein said fuel tank inner cap is comprised of:
a filling chamber with an upper filling chamber opening and a lower filling chamber end being opposite said upper filling chamber opening and having a filling chamber bottom portion and a filling chamber side wall, said filling chamber being disposed in said inner cap center; and
a volume chamber with an upper volume chamber port connected to said lower filling chamber end, and a lower volume chamber end opposite said upper volume chamber port, said volume chamber having a volume chamber bottom portion at said lower volume chamber end, and an inner volume chamber side wall connected to said filling chamber bottom portion,
wherein said fuel tank outer cap is positioned above said fuel tank inner cap and over said upper filling chamber opening;
an upper vent cap having an upper vent cap side wall and being positioned at said upper volume chamber port, relative to said inner volume chamber side wall so as to form an air gap around said upper vent cap side wall;
a lower breathing panel-being positioned at said lower filling chamber end so as to cover said upper volume chamber port,
wherein said lower breathing panel is comprised of a welding ring facing toward said upper volume chamber port from said lower breathing panel,
wherein said welding ring is fixed and connected with said filling chamber bottom portion between said air gap and said filing chamber side wall, and
wherein said volume chamber bottom portion is comprised of air inlet/outlet; and
fuel-adsorbing filler-contained in said filling chamber.

2. The fuel tank cap with charcoal canister according to claim 1, wherein said welding ring is comprised of an ultrasonic welding ring.

3. The fuel tank cap with charcoal canister according to claim 1, further comprising:
an upper breathing panel covering said fuel-adsorbing filler and being set at said upper filling chamber opening.

4. The fuel tank cap with charcoal canister according to claim 3, further comprising:
an inner deck-covering said upper filling chamber opening and being set between said fuel tank outer cap and said upper breathing panel.

5. The fuel tank cap with charcoal canister according to claim 4, wherein said inner deck is comprised of several upper vent holes,
wherein said upper vent cap is comprised of several lower vent holes,
wherein each upper vent hole corresponds to a respective lower vent holes,
wherein said lower vent holes are set right above-said air inlet/outlet, and
wherein said upper vent holes-are set right above said lower vent holes in one-to-one correspondence.

6. The fuel tank cap with charcoal canister according to claim 1, further comprising:
a lower vent cap being placed between said upper vent cap and said lower volume chamber end and having a lower vent cap center with a through-hole; and
a breathing valve inside said through-hole.

7. The fuel tank cap with charcoal canister according to claim 6, wherein said inner volume chamber side wall has a funnel-shaped portion with an upper funnel end so as to form an installation base, said lower vent cap-being set in said installation base.

8. The fuel tank cap with charcoal canister according to claim 1, further comprising: a removable hook removably attached to said fuel tank inner cap.

9. The fuel tank cap with charcoal canister according to claim 1, wherein said lower breathing panel-has a smooth lower surface.

* * * * *